3,170,759
METHOD OF MAKING PLUTONIUM MONOCARBIDE
Ross M. Mayfield, Glen Ellyn, and William G. Tope, Naperville, Ill., assignors to the United States of America as represented by the United States Atomic Energy Commission
No Drawing. Filed June 19, 1962, Ser. No. 203,666
1 Claim. (Cl. 23—14.5)

This invention deals with a process of producing plutonium monocarbide.

Plutonium carbide has utility as fuel in nuclear reactors on account of its high resistance to elevated temperatures. Plutonium forms several carbides, such as the monocarbide, PuC, the sesquicarbide, $Pu_2C_3$, and the dicarbide, $PuC_2$. Of these carbides, the monocarbide is preferred for nuclear fuel, because it has the highest concentration of plutonium.

Plutonium monocarbide has been produced heretofore by arc-melting stoichiometric quantities of plutonium and carbon powder. This process, however, had some drawbacks. The density of plutonium metal and of carbon is so radically different that the carbon always floated and remained on the surface of the plutonium mass, and even agitation could not bring about a thorough contact of the carbon with the plutonium. This was responsible for a very low degree of reaction. In order to obtain a substantial amount of plutonium carbide from the arc-melted mixture and a relatively homogeneous product, the arc-melted mass had to be remelted six or seven times, a feature very undesirable for large-scale production. Also, the arc-melting process requires temperatures as high as between 2000 and 2500° C. because of the high melting point of the product.

It is an object of this invention to provide a process for the production of plutonium monocarbide by which a homogeneous product substantially consisting of plutonium monocarbide is obtained.

It is another object of this invention to provide a process for the production of plutonium monocarbide in which the plutonium monocarbide is produced in a one-step, direct-melting process.

It is also an object of this invention to provide a process for the production of plutonium monocarbide which can be carried out at comparatively low temperatures.

It is finally also an object of this invention to provide a process for the production of plutonium monocarbide from plutonium and carbon wherein a satisfactory contact between plutonium and carbon is accomplished so that a comparatively complete reaction is brought about.

It has been found that, when plutonium is melted in a graphite crucible at a temperature below the melting point of plutonium monocarbide, all plutonium reacts readily with the graphite of the crucible and almost pure plutonium monocarbide is obtained in a relatively short time.

The process of this invention thus comprises heating plutonium metal in a graphite crucible at a temperature of between 1575 and 1650° C. for from 35 to 60 minutes while a vacuum is applied and then cooling the reaction product to room temperature under vacuum.

The reaction can be carried out in any type of furnace known to those skilled in the art; electrical resistance furnaces and induction furnaces have proved particularly satisfactory. The plutonium carbide adheres very well to the graphite crucible, which made it difficult to remove the monocarbide therefrom. In order to avoid the necessity of destroying the thick-walled graphite crucible after each batch operation, a thin-walled graphite liner was loosely inserted into a thick-walled graphite holder for each run. After cooling of the plutonium carbide formed, the graphite liner with the plutonium carbide was lifted out of the graphite holder and any nonconsumed graphite adhering to the plutonium carbide was removed therefrom simply by machining it off.

The temperature range of between 1575 and 1650° C. is rather critical; if the temperature is lower than 1575° C., an insufficient amount of carbon diffuses into the plutonium and the reaction also proceeds at too slow a rate, which causes a low yield of plutonium monocarbide within a given period of time. On the other hand, at temperatures above 1650° C., carbon diffusion is too fast and an undesirable amount of $Pu_2C_3$ is formed, so that the plutonium is present in the reaction product in an unnecessarily dilute form. The same is true for the heating time; it should not be below 35 and not be above 60 minutes for the same reason. The shorter heating times within this range are sufficient for laboratory-scale operation, while the longer heating times are advisable for large-scale operation.

Under the conditions specified above, a product is usually obtained that contains less than about 15 w/o of $Pu_2C_3$, but mostly less than about 10%, the balance always being plutonium monocarbide, PuC. These contents have been determined by microscopical estimation.

The plutonium monocarbide, as mentioned before, is cooled in vacuum. It can be used as is, in powder form (plutonium monocarbide is very brittle), or it can be shaped into bodies of desired configuration by compacting or casting.

When casting of plutonium carbide into "shapes" is desired, the plutonium carbide is melted in a tantalum crucible the inner surface of which has a thin tantalum carbide coating. This coating has been formed, prior to charging it with the plutonium carbide, by applying graphite to the tantalum crucible and firing at about 1850° C. The tantalum crucible used for the experiments described herein had an opening in the bottom which could be closed and opened at will by a retractable stopper rod.

Below this tantalum crucible a mold is arranged into which the plutonium carbide is to be cast. This mold is made of graphite and its inner surface is coated with tantalum after which it is fired at about 1850° C. to form tantalum carbide. Both melting and casting are carried out under a vacuum. In most instances the vacuum therefor and for the preparation of the carbide was about $10^{-3}$ torr (1 torr=1 mm. Hg).

If in the production process the reaction temperature or reaction time has exceeded optimum conditions, so that an undesirably high fraction of a higher plutonium carbide has been formed (above about 5% by weight), the situation can be remedied in the casting step. In this case a small quantity of plutonium is added to the plutonium carbide in the melting crucible for the conversion of the higher carbide to PuC. Yttria coatings have been tried for this purpose but not found too satisfactory, because some yttria was always picked up by the melt. Therefore the carburized tantalum crucibles are preferred.

In the following table a few experiments are summarized which were carried out on the production of plutonium carbide by processes used heretofore and by the process of this invention. The temperatures shown in the table were maintained for about 40 minutes in each case. The carbon contents of the reaction products, before casting, are given in the table; they are indicative of the degree of plutonium monocarbide formed. For Runs Nos. 2, 5, 7 and 8 two analyses and for Run No. 3 three analyses are given which were taken at different sections of the product material.

| Run No. | Charge Material | G. of Pu Used | Crucible | Temp., °C. | Carbon Content, w/o |
|---|---|---|---|---|---|
| 1 | Pu Melt Scrap | 191 | Unlined Graphite | 1,880 | 9.12 |
| 2 | 97 g. Pu Button Stock Added to 84 g. Reacted Material of Run No. 1. | ~177 | Yttria-Coated Graphite | 1,665 | 4.97 / 5.38 |
| 3 | Pu Button Stock and Graphite Powder. | 177 | Tantalum Lined Crucible | 1,525 | 0.44 |
| 4 | Same as Run No. 3. | 179 | ...do... | 1,720 | -------- |
| 5 | Pu Button Stock | 211 | Unlined Graphite | 1,600 | 4.1 / 4.6 |
| 6 | ...do... | 173 | ...do... | 1,600 | 4.2 Side / 4.3 Top / 4.9 Center |
| 7 | Pu Button | 353 | ...do... | 1,600 | 4.5 / 4.4 |
| 8 | ...do... | 356 | ...do... | 1,590 | 4.4 / 4.1 |

A study of the above experiments will show that a temperature of 1880° C. (Run No. 1) was too high and yielded a carbon content almost twice as high as the theoretical content (4.7 w/o) for plutonium monocarbide. In Run No. 2 the material of Run No. 1 was remelted in an yttria-coated graphite crucible with additional plutonium; there the temperature of 1665° C. was used; that this is outside the scope of optimum temperature is obvious from the fact that the carbon content is above the theoretical 4.7%.

Run No. 3 was carried out by melting a plutonium button and graphite powder similarly to the arc-melting process used heretofore; a temperature of 1525° C. was used. It is obvious from the extremely low carbon content of 0.44% of the product that hardly any carbide was formed in Run No. 3. Run No. 4 was analogous to Run No. 3, with the exception that a temperature of 1720° C. was used there; however, this temperature increase did not have any effect on the reaction.

Runs Nos. 5 through 7 were experiments carried out according to this invention. In these instances plutonium metal was heated in an unlined graphite crucible at about 1600° C., the optimum temperature. Run No. 5 showed carbon contents of 4.1 and 4.6 w/o, respectively, the latter especially being very close to the theoretical content. In Run No. 6, three analyses were performed, one on the side, one at the top and one in the center of the product body. The carbon contents were 4.2, 4.3 and 4.9 w/o, respectively; the discrepancies are within analytical error. The carbon contents of Runs Nos. 7 and 8 were close to theoretical values and in either instance similar in both sections analyzed; this indicates that good homogeneity had been attained.

It will be understood that the invention is not to be limited to the details given herein but that it may be modified within the scope of the appended claim.

What is claimed is:

A process of producing plutonium monocarbide, comprising heating plutonium metal in a graphite crucible at between 1575 and 1650° C. for from 35 to 60 minutes while applying a vacuum, and cooling the product obtained to room temperature under vacuum.

References Cited by the Examiner
UNITED STATES PATENTS

| | | | |
|---|---|---|---|
| 1,829,950 | 11/31 | Voigtlander et al. | 23—14.5 |
| 2,526,805 | 10/50 | Carter et al. | 23—14.5 |
| 3,023,119 | 2/62 | Anderson et al. | 22—216.5 |
| 3,049,481 | 8/62 | Herrick | 176—70 |

OTHER REFERENCES

Drummond et al.: Chemical Society Journal, 1957, pt. 4, pp. 4785–4786.

AEC Document, NAA–SR–5346, Aug. 1, 1959, pp. 9–11.

AEC Document BMI–1441, May 31, 1960, p. 76.

CARL D. QUARFORTH, *Primary Examiner.*